June 7, 1938. W. F. EPPENSTEINER 2,119,859
STORAGE BATTERY STRIPPER
Original Filed March 26, 1935 3 Sheets-Sheet 1
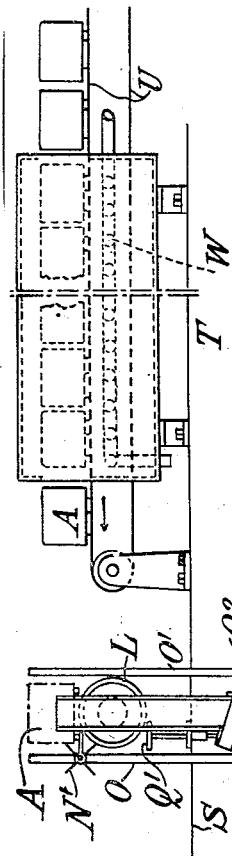
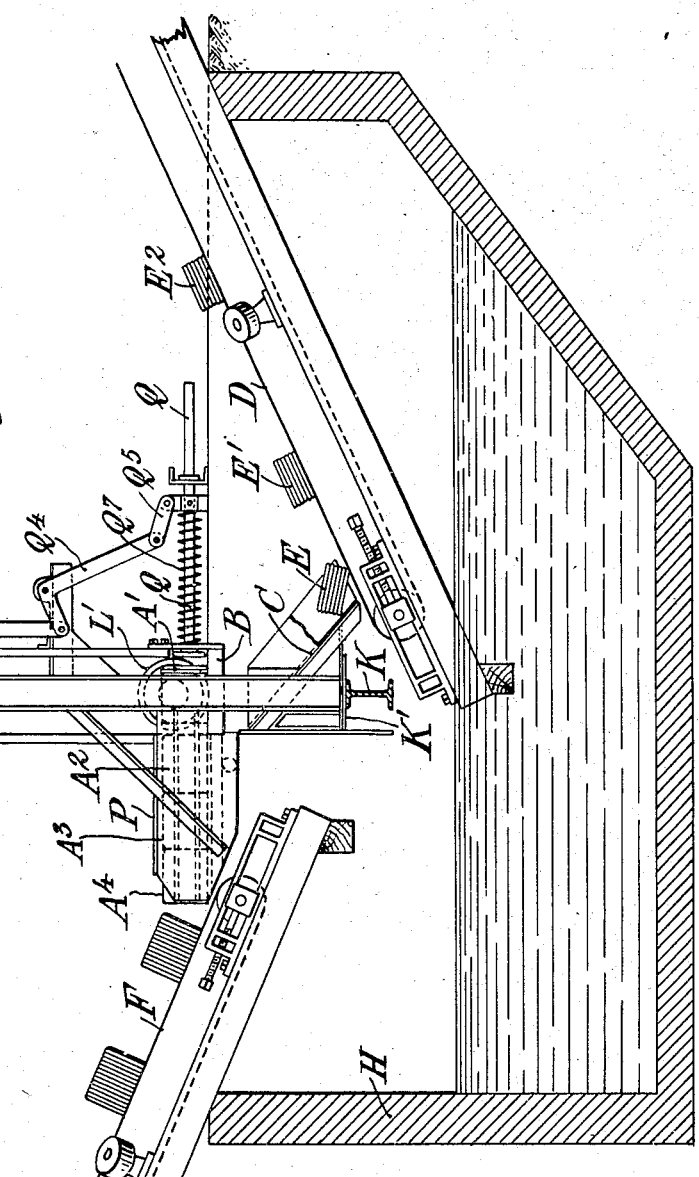
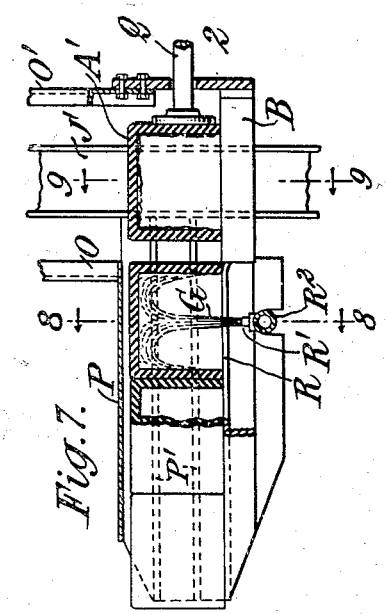
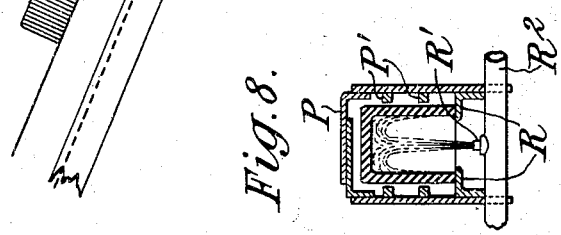
INVENTOR
William F. Eppensteiner
BY
Frazer, Myers & Manley
ATTORNEYS.

June 7, 1938.  W. F. EPPENSTEINER  2,119,859
STORAGE BATTERY STRIPPER
Original Filed March 26, 1935   3 Sheets-Sheet 2
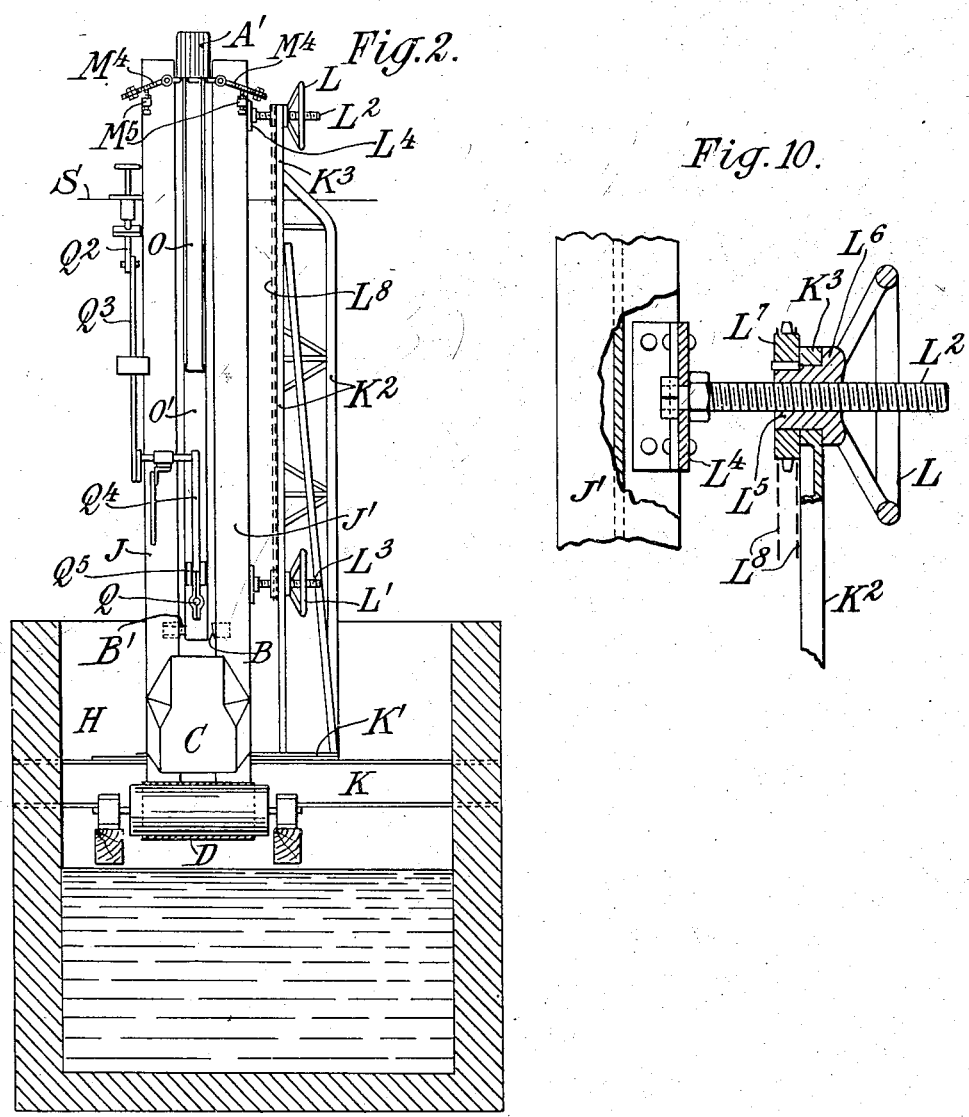
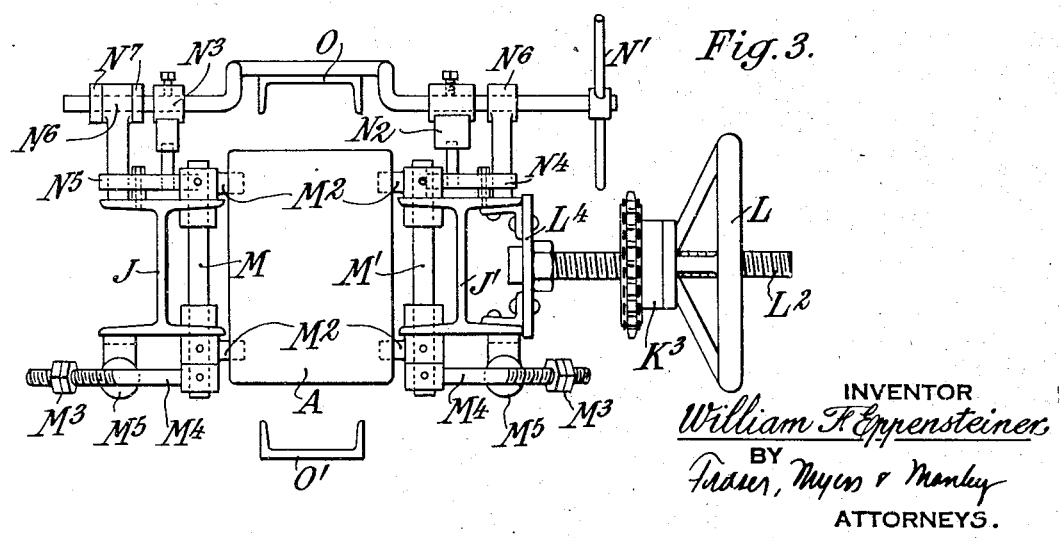
INVENTOR
William F. Eppensteiner
BY
Fisher, Myers & Manley
ATTORNEYS.

June 7, 1938.  W. F. EPPENSTEINER  2,119,859
STORAGE BATTERY STRIPPER
Original Filed March 26, 1935   3 Sheets-Sheet 3

INVENTOR
William F. Eppensteiner,
BY
Fraser, Myers & Morley
ATTORNEYS.

Patented June 7, 1938

2,119,859

UNITED STATES PATENT OFFICE 2,119,859

STORAGE BATTERY STRIPPER

William F. Eppensteiner, Rahway, N. J., assignor to The American Metal Company, Limited, New York, N. Y., a corporation of New York Original application March 26, 1935, Serial No. 13,105. Divided and this application April 9, 1937, Serial No. 135,904

17 Claims. (Cl. 136—174)

This invention, a division of co-pending application, Serial No. 13,105, filed March 26, 1935, relates to the salvaging of storage batteries—that is, to the recovering of the valuable metals from such batteries after they have served their normal life as sources of electrical energy; and in its more particular aspects it has to do with an improved apparatus wherein the valuable plate section of such a battery may be stripped from its casing in a most economical manner.

Storage batteries of the type widely used in motor vehicles, railroad cars and the like, generally comprise a plurality of spongy metal, and metal oxide, plates which are joined together as a "plate section" and sealed by asphaltum or comparable material within the open end of a cheap insulating casing. The rigors of use, constant vibration and shocks of its supporting structure, tend to shake the spongy material away from its supporting grids, and to injure the casing, to such extent that the battery has a normal life of from twelve to eighteen months. Thereafter, as a source of electrical energy, it is substantially useless. However, the plate sections, and the sludge which has collected in the bottom of the casing, is of very considerable value and is a source of income to a fairly large salvaging industry. The casing, however, is of substantially no value.

In the past the salvaging has been carried out either by breaking the valueless casings by hand, or by manually removing the asphaltum seal and then separating the plate section from its casing. Both such methods were costly, and further, a considerable portion of the valuable sludge was lost. Further, the broken up casings were quite difficult to handle; and since the casing represents a loss in any event, any reduction which can be effected in the cost of handling it represents a substantial monetary gain in the salvaging process.

The principal object of the present invention is to remove the valuable metallic portion of the battery from its supporting casing in an efficient manner, and one which will result in a recovery of substantially all the valuable material. There is very little salvage to be obtained from the casing itself under present economic conditions and practices, but the invention possesses the added feature of preserving the casing intact, so that it may be easily handled and transported.

The average battery weighs, all told, approximately 35 to 50 pounds. About fifty per cent of this weight is represented by lead and antimony, approximately half of which is in the grid itself and the other half in the sludge; 20 to 25 per cent by the casing, 10 per cent by the plate spacers and other extraneous elements, and the remainder moisture.

According to the present invention the removal or stripping of the plate section is accomplished by utilizing the property of inertia of these somewhat heavy batteries. Specifically, the method practiced in the present invention involves an acceleration of the battery casing, with respect to the plate section, whereby the inertia of the latter parts will break the asphaltum seal holding them within the casing. Preferably this is done by allowing the battery to fall freely in an inverted position—that is, with its sealed side downward—so as to build up some considerable momentum; and then suddenly to arrest the movement of the casing so that the inertia of the heavy plate section may impose a stress on the asphaltum seal, of sufficient magnitude to break that seal and allow the plate section to escape.

It is a further object of the invention to provide an apparatus wherein such an "inertia" method of stripping may be practiced; and to provide suitable conveying means in conjunction with the stripper for carrying away the separated parts of the battery to points of subsequent use.

The full nature of the invention and other objects and features thereof will be more fully understood by a consideration of the following description in the light of the accompanying drawings, in which:—

Figure 1 is a side elevation, partly in section, of an apparatus embodying the principal features of the invention.

Fig. 2 is an end elevation of the same, also partly in section.

Fig. 3 is a plan view of the upper portion of Fig. 2 drawn to a larger scale.

Fig. 7 is a detailed view of the mechanism for washing the battery cases after the plate section has been removed.

Fig. 8 is a sectional view taken on the line 8—8 of Fig. 7.

Fig. 10 is a detail of the guide-adjusting means comprising a part of the apparatus.

Figure 4:
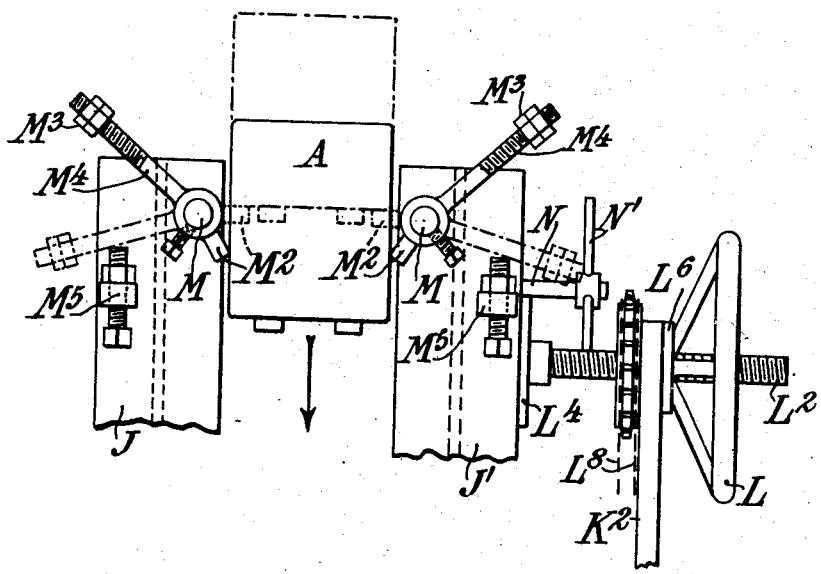
Fig. 4 is a view of one end of the detailed structure shown in Fig. 3, illustrating in its dotted line position, the supporting of a battery at the top of the chute; and in its full line position, the releasing of that battery.
Figure 5:
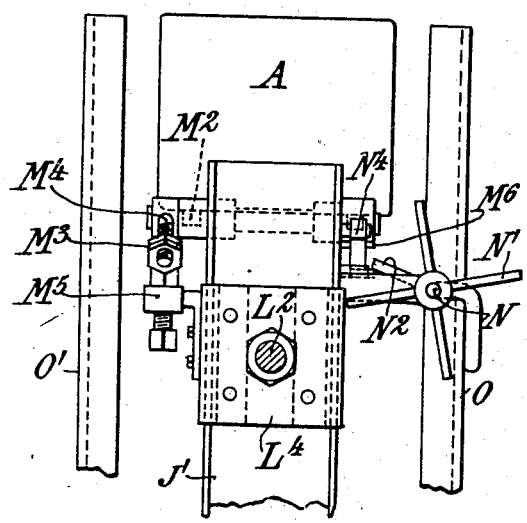
Fig. 5 is a view of one side of the structure of Fig. 3, with the adjusting hand wheel and certain other parts omitted.

The stripping of storage batteries in accordance with the "inertia" method hereinbefore described may best be understood by reference to Fig. 1, and briefly it comprises dropping the battery A (shown in dotted lines at the top of Fig. 1) down a vertical chute in an inverted position, i. e., with its sealed side down. When it arrives at the point $A^1$, (Fig. 1) the casing is arrested by a pair of stops or abutments B, B', best shown in Figs. 2 and 9. During the drop, which ordinarily approximates seven or eight feet, the entire battery has acquired some very considerable momentum. Hence, when the casing is arrested by the stops B, B, the inertia of the heavy metallic plate section is sufficiently great to impose a stress on the heavy asphalt seal of such magnitude as to break this seal, and permit the interior plate section to continue downwardly between the abutments B, B, so as to separate them completely from the casing. Preferably the plate sections are caught upon an inclined chute C and guided downwardly upon an elevating belt D, as shown at E, $E^1$ and $E^2$ in Fig. 1. The battery casings $A^1$, $A^2$, $A^3$, etc., after being arrested by the abutments B, B', are then pushed along a guideway constituting an extension of the abutments, and are finally automatically loaded on an elevating belt F for suitable disposition. During the transit from the abutments to the elevating belt the casings preferably pass over a washing station where streams of water are directed upwardly into the bottoms of the casings so as to wash out any residual sludge, the water and sludge being collected in the sump H for subsequent disposition.

Referring now in detail to the apparatus illustrated in the drawings, the vertical chute comprises a pair of H-beams J, $J^1$, one of which, J, may be stationary, and the other of which, $J^1$, may be movable for the purpose of accommodating batteries of different dimensions. In the construction shown, the entire chute is mounted upon an I-beam K extending across the short dimension of the sump and having on its top a suitable plate $K^1$, upon which the lower ends of the H-beams rest. A trussed framework $K^2$ is also supported upon the plate K' and serves as a fixed structure, from which the movable H-beam $J^1$ is held erect in any of its various adjusted positions. Such adjustment can be conveniently accomplished by means of a pair of hand wheels L, $L^1$, which are threaded to operate on fixed screws $L^2$, $L^3$, these screws being fastened at their inner ends to plates $L^4$ which are rigidly connected to the H-beam J'. The detailed construction is illustrated in Fig. 10, and there it may be seen that the screws pass through the member $K^3$ of the frame $K^2$ and make threaded connection with the hub of the hand wheels L, $L^1$; and that these hand wheels have hubs $L^5$ passing through the member $K^3$, an outside flange $L^6$ engaging one surface of the member $K^2$ and an inside collar $L^7$ engaging the other surface of the member so as to prevent lateral movement of the wheel with respect to the trussed structure but to permit rotation thereof, whereby the H-beam $J^1$ may be brought to any desired adjusted position and held there. The invention includes means for adjusting both hand wheels L and $L^1$ simultaneously so that both the top and the bottom of H-beam $J^1$ are moved inwardly and outwardly to the same extent. A simple method of accomplishing the foregoing result is to construct the collars $L^7$ as sprockets, and to connect them by a chain $L^8$ so that adjustments of the beam may be made by manipulating either the upper wheel or the lower one.

To facilitate orderly and properly timed dropping of batteries down the vertical chute I provide a supporting and tripping mechanism at the top thereof, the preferred form of which is best illustrated in Figs. 2 to 6, inclusive. In this form I make use of two rock shafts carried by the H-beams J and $J^1$, respectively, such rock shaft being designated by the reference letters M, $M^1$. At each end of each rock shaft is a short supporting arm $M^2$, the four arms facing each other and being designed to support a battery A until it is released. Each of the arms $M^2$ has a stop $M^6$, upon its hub (Fig. 6) each adapted to be engaged by an adjacently disposed latch $N^4$ or $N^5$ so as to prevent rotation of the rock shafts M, $M^1$, and thus holding the arms $M^2$ beneath the battery and preventing its untoward descent down the chute.

Figure 6:
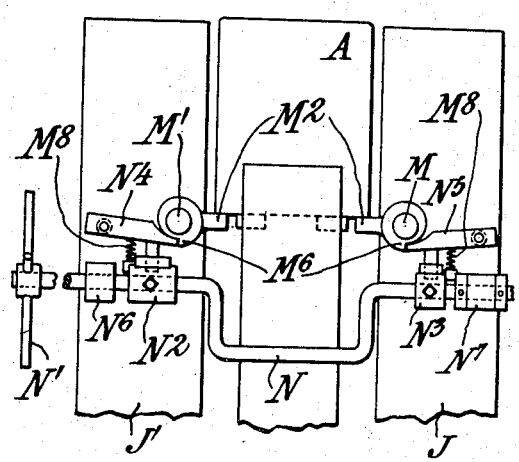
Fig. 6 is a detailed view of the other end of the structure of Fig. 3.

Any suitable means may be provided for releasing the latches $N^4$, $N^5$, when it is desired to drop the battery. The means shown (Fig. 3) comprises a shaft N held in bearings $N^6$, $N^6$, fastened to the H-beams J and $J^1$, provided with a hand lever $N^1$, and with collars $N^7$, $N^7$, to prevent longitudinal movement of the shaft in its bearings. The shaft is offset at its middle portion to pass around the channel beam, as may best be seen in Fig. 6; and the normal position of this shaft is illustrated in the latter figure. The shaft N further carries two fingers $N^2$, $N^3$, which are adapted to engage projections on the two latches $N^4$ and $N^5$, so as to move the latches downward and release the rock shafts M, $M^1$, permitting the latter to rotate and thereby drop the battery down the chute. As soon as the battery escapes from the supporting arms $M^2$, the offset portion of the shaft N turns this shaft to its normal or inactive position; and each of the rock shafts M, $M^1$, is provided with a counterweight $M^3$ mounted upon the arms $M^4$ so as to bring these rock shafts, and the supporting arms $M^2$, back to their normal position where the latches $N^4$, $N^5$, may automatically re-engage the stops $M^6$ under the action of springs $M^8$, all as illustrated in Figs. 4 and 6.

By reference to Fig. 3 it will be noted that the finger $N^2$ is made somewhat wider than the finger $N^3$. This is done in order that it may engage its latch when the H-beam $J^1$ has been adjusted to any of its various positions to accommodate larger or smaller batteries than the one illustrated at A.

The channel irons O, O', one of which (O) is utilized for limiting the rocking movement of the shaft N, form end guides for the battery and thus confine it, in its downward flight, within the chute. One of these channel irons is conveniently supported by attachment to the post J and the other by a hood member P, as may best be seen in Figs. 1 and 7.

Figure 9:
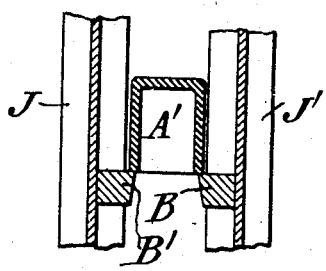
Fig. 9 is a like view taken on the line 9—9 of Fig. 7.

After the battery is released, by turning the tripping handles N as above set forth, it falls freely downwardly until it engages the abutments B, B', in the manner illustrated in Fig. 9. It is important to note that these abutments, or rails, are carried by the adjacent posts J, $J^1$ of the chute; and that they are spaced apart sufficiently so as to engage only the edges of the battery casing as the latter completes its downward flight. The heavy interior plate section of the battery, as has hereinbefore been described, during flight, attains some very considerable momentum; and when the casing is suddenly arrested, all of the momentum of these heavy parts is immediately directed against the asphalt seal so as to break the latter.

Again referring to Fig. 9, it will be noted that the spacing of the abutments B, B', is such as to leave an area therebetween through which the plate section of the battery may freely pass; and hence, when the casing is arrested, these parts continue their downward flight until they are engaged by the inclined chute C, and they then pass laterally and downwardly to the elevating belt D, the latter preferably being continuously driven and being of any common form having the usual adjusting mechanism.

The battery casing, unless it is in a very poor condition, will remain intact; and will rest upon the abutments B, B', as shown at A' in Fig. 7. Obviously, before another battery is released from the top of the chute, this casing A' must be displaced; and the invention provides means for accomplishing this in a very simple manner. As shown in Fig. 1, this mechanism comprises a pusher rod Q, suitably guided, and adapted to be reciprocated by a linkage system operated from treadle Q'. This system may be of any suitable character, comprising, for instance, a pivoted lever $Q^2$ operating a pusher rod $Q^3$ connected, in turn, to the arm of the bell-crank $Q^4$, and a link $Q^5$ connecting the longer arm of the bell-crank to the push rod Q. Thus, when the treadle is stepped upon, the push rod will be advanced (from left to right as shown in Fig. 1) and its head will engage and move the casing A' along the abutments and the track R (the latter constituting a continuation of the abutments; and the movement of the pusher is so limited that the empty battery box will move a distance roughly approximating its own length so as to clear the abutments for the accommodation of the next descending battery. Upon release of the treadle, of course, the counterweight $Q^6$, either alone or in combination with the spring $Q^7$, will return the pusher to the normal position as illustrated in Figs. 1 and 7.

The track R is disposed beneath a hood P and is designed to guide the empty casings onto the elevating conveyor F for disposition in any desired manner. Prior to such disposition, however, it is desirable that the casings be thoroughly washed in order to recover any sludge which may be retained therein, and for this purpose the invention provides a washing station located beneath the track R and comprising one or more jets of water G directed upwardly into the bottoms of the casings from nozzles $R^1$ and water supply pipe $R^2$. By thus sluicing out the inverted battery casings, all of the sludge adhering to the inside walls thereof will be dislodged and will be collected in the sump H. Some considerable recovery of metal is made in this fashion, and in any event the sluicing operation cleans the casing so that all extraneous weight is removed therefrom prior to its disposition.

During the cleaning operation the hood P, of course, serves to restrict the spraying or spattering of the cleaning water; and this hood, if desired, may be provided with guiding ribs P' engaging the sides of the battery casings to prevent lateral movement thereof.

In constructing the device I provide a loading platform S, which, preferably, is at the unloading level of the gondolas as freight cars in which dead batteries are brought to the salvaging plant. The unloaded batteries may be moved on a conveyor U to a point adjacent the top of the stripping apparatus, from whence they may be lifted, by hand, for example, and placed on the supporting arm $M^2$ of the tripping mechanism. The latter is then actuated through the intermediary of lever N to drop the battery and strip its plate section from the casing; and after each battery is stripped, the treadle $Q^1$ is depressed by the operator to move the empty casing laterally away from the chute to a washing station; and the pusher is retracted, all in the manner hereinbefore set forth.

It sometimes happens in cold weather that the small amount of liquid contained in the casings freezes and provides an additional seal tending to hold the plate sections within the casings. Also when this liquid is frozen it interferes very materially with the removal of the sludge. To obviate these disadvantages I prefer to provide a heater T, shown in Fig. 1, which comprises a chamber disposed over the conveyor U and having a heating element, such as a steam coil W disposed therein. Preferably, as shown in Fig. 1, the batteries are disposed on the conveyor U in inverted position ready for immediate transference to the top of the chute. Hence the steam coil is preferably disposed beneath the belt so that its heat may be directed, most effectively, against the battery to thaw the frozen material of the latter.

The tracks R, hood P, guides $P^1$, abutments B, B', and inclined chute C, may comprise relatively movable parts, of which those relating to one side of the structure may be secured to and supported by the H-beam J, and those relating to the other side of the structure may be secured to and supported by the H-beam J', so that when the latter beam is adjusted, by the rotation of hand wheels L, $L^1$, to adapt the mechanism for stripping batteries of any particular size, the abutments, the inclined chute, hood and associated parts of the mechanism will be correspondingly adjusted.

While I have shown and described the invention in its preferred form, it will be understood that many changes may be made therein without departing from the spirit of the invention; and accordingly the foregoing is to be construed in a descriptive rather than in a limiting sense.

What I claim is:

1. An apparatus for stripping storage batteries of the type having a plate section sealed within a casing, comprising a substantially vertical chute into the top of which a battery may be placed in an inverted position, said chute having a height several times as great as the depth of the battery to be stripped, and spaced abutments arranged at the lower end of said chute and adapted to arrest only the casing of the battery so that its plate section may break the seal by its momentum and completely escape from the casing.

2. An apparatus for removing the interior parts of sealed batteries from their casings, comprising a substantially vertical chute into the top of which the batteries are placed in an inverted position, abutments arranged at the lower end of said chute and adapted to arrest only the casings so that the interior parts may break the seals by their momentum and thereby escape, and a battery-releasing supporting device mounted in the top of the chute for temporarily supporting the batteries and for dropping the same.

3. An apparatus for stripping storage batteries of the type having a plate section sealed within a casing, comprising a substantially vertically disposed chute into the top of which such a battery may be placed with its sealed side directed downwardly, said chute having a height several times as great as the depth of the battery to be stripped; and an arresting means located at the bottom of said chute comprising a pair of rails so spaced apart as to engage only the edge portions of the casing of such a battery resting thereon and to leave a free area therebetween of such dimensions that the plate section of such a battery may pass completely therethrough, said chute being of such proportions as to direct a freely falling battery against said rails whereby to arrest the casing and permit the plate section to break away therefrom.

4. An apparatus for removing the interior parts of sealed batteries from their casings, comprising a substantially vertical chute into the top of which the batteries are placed in an inverted position, spaced abutments arranged at the lower end of said chute and adapted to arrest only the casings so that the interior parts may break the seals by their momentum and thereby escape from the casings, a battery-releasing supporting device mounted in the top of the chute for temporarily supporting the batteries beneath their downwardly directed sides before dropping the same, and manually operated means for tripping the supporting means.

5. An apparatus for removing the interior parts of sealed batteries from their casings, comprising a substantially vertical chute into the top of which the batteries are placed in an inverted position, abutments arranged at the lower end of said chute and adapted to arrest only the casings so that the interior parts may break the seals by their momentum and thereby escape from the casings, a battery-releasing supporting device arranged at the top of the chute for temporarily supporting the batteries before dropping the same, said supporting means comprising a plurality of arms arranged to engage the battery casings beneath their downwardly directed sides, and means for releasing the batteries from the supports whereby to permit the former to drop.

6. An apparatus for removing the interior parts of batteries from their casings, comprising a vertical chute having at its lower end an arresting means adapted to engage the edges of an inverted battery, a pair of rock shafts mounted near the top of said chute and having arms designed to fit under and engage a battery, latches for preventing movements of said rock shafts, and means for releasing said latches to permit the battery to escape.

7. An apparatus for removing the interior parts of batteries from their casings, comprising a vertical chute having at its lower end an arresting means adapted to engage the edges of an inverted battery, a pair of rock shafts mounted near the top of said chute and having arms designed to fit under and engage a battery, latches for preventing movements of said rock shafts, means for manually releasing said latches to allow said rock shafts to rotate to permit the battery to escape, and counterweights on said rock shafts to restore the latter to operative positions after escape of the battery.

8. An apparatus for stripping and salvaging the valuable parts of storage batteries of the type having a plate section sealed within a casing, comprising a pair of abutments spaced apart so as to engage only the edges of such a battery and to leave a free space therebetween through which the plate section of the battery can pass, a substantially vertical chute adapted to guide a freely falling battery with its sealed side down against such abutments from a height sufficient to impart such momentum to the battery as will cause its plate section to break the seal and escape between the abutments when the casing is arrested by the abutments, and means located beneath the abutments for arresting the plate section after it has been completely separated from its casing.

9. An apparatus for removing the interior parts of batteries from their casings, according to claim 8, further characterized in that the chute comprises two vertical guide members, one of which is adjustable to alter the width of said chute to accommodate batteries of varying widths.

10. An apparatus for removing the interior parts of batteries from their casings, according to claim 8, further characterized in that the chute comprises two vertical guide members, one of which is adjustable to alter the width of said chute to accommodate batteries of varying widths, said adjusting means comprising screw-threaded bolts and a threaded hand wheel engaging said bolts.

11. An apparatus for removing the interior parts of batteries from their casings, according to claim 8, further characterized in that the chute comprises two vertical guide members, one of which is adjustable to alter the width of said chute, said adjusting means comprising a plurality of screw-threaded bolts connected to said adjustable guide member and a plurality of manually operable screw-threaded members connected to each other for movement, whereby the plurality of adjusting members may be operated from a single point.

12. An apparatus for removing the interior parts of batteries from their casings, according to claim 8, further characterized in that the chute comprises two vertical guide members, one of which is adjustable to alter the width of said chute, said adjustable member being provided with a pair of screw-threaded bolts, screw-threaded parts provided with hand wheels for moving said screw-threaded bolts, and a sprocket and chain connection between said screw-threaded parts, whereby each of said last-named parts can be moved by the other.

13. An apparatus for stripping and salvaging storage batteries according to claim 8, further characterized in that the chute has an open side adjacent the abutments through which an empty battery casing may be moved laterally out of the chute.

14. An apparatus for stripping and salvaging batteries according to claim 8, further characterized in that the chute has an open side adjacent the abutments, and means for engaging an empty casing supported on said abutments and for moving it laterally out of the chute.

15. An apparatus for stripping and salvaging batteries according to claim 8, further characterized in that the chute has an open side, extensions of the abutments passing laterally through such open side, means for moving an empty battery casing with its open side down along such extension away from said chute, and means located beneath the extensions for directing streams of water upwardly into the open casing to wash out sludge.

16. An apparatus for removing the interior parts of batteries from their casings, comprising four flanged H-beams extending in vertical direction, open at their upper ends to receive a battery with its sealed side directed downwardly, and spaced apart so that their inwardly directed flanges define a guideway for the battery, a pair of spaced abutments at the lower end of said guideway adapted to engage only the edges of the battery casing and to leave a free area through which the interior battery parts may escape, a delivery chute located below said abutments adapted to lead the ejected battery parts to a point away from said guideway, a traveling carrier for receiving said parts, a pushing device for moving the battery casings laterally away from the guideway, a holding and tripping device at the top of said guideway, a manually operable means for tripping said device located near the top of said guideway, and a manually operable means for operating said pushing device also located at the top of said guideway.

17. An apparatus for stripping and salvaging storage batteries of the type having a plate section sealed within a casing, comprising a substantially vertical chute having an open upper end into which such a battery may be placed with its sealed side directed downwardly, abutments located in the chute approximately seven or eight feet below its open upper end, said abutments being so spaced apart as to engage only the edges of the casing of a descending battery while leaving a free area through which the plate section may escape, arresting means located beneath the abutments by a distance in excess of the depth of a battery plate section for arresting such a plate section after it has been completely separated from its casing, and an opening in a side of the chute adjacent the abutment through which an empty battery casing may be moved out of the chute.

WILLIAM F. EPPENSTEINER.